(12) United States Patent
Meline

(10) Patent No.: US 11,865,814 B2
(45) Date of Patent: Jan. 9, 2024

(54) P-STATIC CAPPED STRETCHED ACRYLIC TRANSPARENCIES

(71) Applicant: Texstars, LLC, Grand Prairie, TX (US)

(72) Inventor: Ronald L. Meline, Arlington, TX (US)

(73) Assignee: Texstars, LLC, Grand Prairie, TX (US)

( * ) Notice: Subject to any disclaimer, the term of this patent is extended or adjusted under 35 U.S.C. 154(b) by 382 days.

(21) Appl. No.: 15/459,110

(22) Filed: Mar. 15, 2017

(65) Prior Publication Data

US 2017/0266926 A1 Sep. 21, 2017

Related U.S. Application Data

(60) Provisional application No. 62/308,304, filed on Mar. 15, 2016.

(51) Int. Cl.
| | |
|---|---|
| *B32B 17/10* | (2006.01) |
| *B29C 39/00* | (2006.01) |
| *B29C 39/38* | (2006.01) |
| *B32B 27/28* | (2006.01) |
| *B32B 27/30* | (2006.01) |
| *B32B 27/08* | (2006.01) |
| *B29K 105/00* | (2006.01) |
| *B29L 31/30* | (2006.01) |
| *B29C 39/26* | (2006.01) |

(52) U.S. Cl.
CPC ...... *B32B 17/10697* (2013.01); *B29C 39/003* (2013.01); *B29C 39/38* (2013.01); *B32B 17/10917* (2013.01); *B32B 27/08* (2013.01); *B32B 27/286* (2013.01); *B32B 27/308* (2013.01); *B29C 39/265* (2013.01); *B29K 2105/0008* (2013.01); *B29K 2995/0005* (2013.01); *B29L 2031/3076* (2013.01); *B32B 2250/02* (2013.01); *B32B 2270/00* (2013.01); *B32B 2307/202* (2013.01); *B32B 2307/21* (2013.01); *B32B 2307/412* (2013.01); *B32B 2605/18* (2013.01)

(58) Field of Classification Search
CPC ........ B32B 17/10697; B32B 17/10917; B32B 27/08; B32B 27/308; B32B 2250/02; B32B 2307/21; B32B 2307/412; B29C 39/003; B29C 39/38; B29C 39/265; B29K 2105/0008; B29L 2031/3076
See application file for complete search history.

(56) References Cited

U.S. PATENT DOCUMENTS

| | | | |
|---|---|---|---|
| 2006/0202171 A1* | 9/2006 | Yoshida | C08J 3/09 252/500 |
| 2011/0097586 A1* | 4/2011 | Liao | C09D 183/14 524/588 |
| 2015/0183945 A1* | 7/2015 | Shiraishi | G02B 5/305 359/513 |

OTHER PUBLICATIONS

Drobny et al., Handbook of thermoplastic elastomer, https://www.sciencedirect.com/topics/engineering/biaxial-orientation (Year: 2014).*

* cited by examiner

*Primary Examiner* — Samir Shah
(74) *Attorney, Agent, or Firm* — Neil J. Friedrich

(57) ABSTRACT

The present invention provides an aerospace or aircraft transparency which, generally, includes a cast acrylic having a conductive acrylic incorporating a conductive ionic polymer is cast thereatop and cured. In a second embodiment hereof, a stretchable acrylic formulation having a conductive polymer admixed therewith along with a minor amount of a cross-linking agent cast atop a ply of unfilled stretchable acrylic. The stack is simultaneously cured and then stretched.

14 Claims, No Drawings

P-STATIC CAPPED STRETCHED ACRYLIC TRANSPARENCIES

CROSS-REFERENCE TO RELATED APPLICATIONS

This application is a completion application of co-pending U.S. Provisional Patent Application Ser. No. 62/308,304, filed Mar. 15, 2016, for "p-Static Capped Stretched Acrylic Transparencies", the entire disclosure of which is hereby incorporated by reference.

BACKGROUND OF THE INVENTION

1. Field of the Invention

The present invention concerns transparencies having an anti-static composition incorporated thereinto. More particularly, the present invention concerns cast and stretched acrylic transparencies having an anti-static containing composition incorporated thereinto.

2. Description of the Prior Art

As is known to those skilled in the art to which the present invention pertains, anti-static compositions have long been known. These anti-static compositions include conductive components which have been dispersed in polymeric coating compositions. Such antistatic compositions have been shown to have many industrial applications, including aerospace applications.

Also, as is known to the skilled artisan, in constructing aircraft, the windows or transparencies are ordinarily made from either cast acrylic, stretched acrylic, polycarbonate, glass laminate and the like, each of which can withstand the pressurization of the cabins, the high speeds, as well as the weather conditions typically encountered during the course of flight.

This build-up of grime, smudge, etc. on the transparencies is well-documented.

In addition to soiling and contamination, during flight, aircraft encounter what is typically denoted as "p-static" or precipitation static electricity, which is static produced by the impingement of rain, snow, hail, dust particles or other particles in the atmosphere onto the various surfaces of an airplane or other aircraft.

p-static results from two atmospheric conditions, namely, the aircraft's presence, itself, in the thunderstorm and the triboelectric charging (frictional) caused by neutral snow, rain or dust particle bombardment of the vehicle frontal service. P-static interference can be created by corona discharges from sharp-edged extremities, streamer discharges on dielectric services, and arch-over between electrically isolated or intermittently grounded metallic sections.

The inherent risk of p-static, especially with such military aircraft, is that it can prevent transmission of telemetry, interfere with radio signals sent by or to the aircraft, and similar potentially hazardous conditions stemming from rapid electrical discharge.

To alleviate the situation for many aerospace transparencies, a conductive p-static coating is employed to bleed off any electrical charge faster than it builds up on the transparency surface. But, the real issue with such a coating is because of wear and tear on the transparency surface, at some point the coating will delaminate and wear off of the transparency surface. Thus, it is readily apparent that the most common point of failure for a p-static coated transparency is the coating itself.

It is to be appreciated that a stretched acrylic, itself, exhibits a goodly amount of wear and tear resistance. Hence, a potential way to make a durable stretched acrylic transparency capable of handling triboelectric charging is to modify the exterior surface of stretched acrylic transparency to one capable of bleeding static charge. As long as this outer layer or exterior surface is a "filled acrylic", such a modified acrylic may be cladded, in lieu of using a foreign "coating".

It is to this to which the present invention is directed.

SUMMARY OF THE INVENTION

The present invention provides an aerospace or aircraft transparency which, generally, comprises a cast or stretched acrylic having a conductive polymer, acrylic polymer incorporated thereinto. For instructional purposes: cast acrylic is polymerized methyl methacrylate that is cured between glass or polished metal plates in order to obtain smooth surfaces. The resultant cast acrylic is thermoplastic and can be formed into shaped transparencies. Stretchable acrylic is cast acrylic that is lightly crosslinked and cured between glass or polished metal plates. Stretched acrylic is stretchable acrylic that has been heated, biaxially stretched and subsequently cooled back to room temperature. Stretched acrylic can be subsequently formed into shaped transparencies having superior crack propagation resistance as compared to cast acrylic.

In a first embodiment hereof, a conductive polymer is admixed with methyl methacrylate, with or without partial polymerization, and then cast on top of a cured sheet of non-conductive cast acrylic. After polymerization and curing of the conductive casting, the conductive cast acrylic is fused on top of the non-conductive cast acrylic sheet thereby yielding a cast acrylic sheet with a conductive cap positioned over one surface of the cast acrylic.

In a second embodiment hereof, a stretchable acrylic formulation has a conductive polymer admixed therewith along with a minor amount of a cross-linking agent. This "filled" acrylate is, then, cast atop a ply of unfilled cured stretchable acrylic. The stack is simultaneously cured and then stretched yielding a stretched acrylic sheet with conductive cap positioned over one surface.

Regardless of which embodiment is employed the result is a cast acrylic transparency having a thin cap of inherently conductive cast acrylic or a stretched acrylic transparency having a thin cap of inherently conductive stretched acrylic.

For a more complete understanding of the present invention, reference is made to the following Description of the Invention.

DESCRIPTION OF THE INVENTION

As hereinabove noted, the present invention pertains to an acrylic transparency having an outer layer or surface of conductive acrylic.

As is known to those skilled in the art to which the present invention pertains a cast acrylic is, essentially, a poly (methyl methacrylate) prepared by casting, under pressure, methyl methacrylate monomer admixed with a catalyst, between glass cell plates and cauls and subsequently polymerizing the methyl methacrylate into a poly (methyl methacrylate). Under suitable polymerization conductors the resultant cast acrylic has a very smooth surface due to the glass casting cell plate.

A stretchable acrylic is a methyl methacrylate having a small amount of a cross-linker in admixture therewith which is cast in the same manner as the non-stretchable acrylic.

With respect to a stretchable acrylic, the acrylic is demolded from a glass cell and then bi-axially stretched at high temperature which provides a degree of crystallinity to the resulting stretched acrylic.

Stretched acrylics are deployed primarily as aerospace transparencies due to their ability to arrest a crack from propagating after cracking is initiated, since non-stretched acrylic is very susceptible to crack propagation. Thus, because of the ability to arrest such crack propagation stretched acrylic has been widely adopted as transparencies in the aerospace industry for use as cabin windows on jetliners, cockpits, and the like.

Typically, stretched acrylic transparencies are stretched from a blank of acrylic material to a desired fitness in order to improve the physical characteristics. Stretching is generally accomplished by either a pulling technique such as disclosed in U.S. Pat. No. Re. 24,978 or by a pressing technique such as taught in U.S. Pat. No. 3,632,841, the disclosures of which are hereby incorporated by reference.

In both techniques, an acrylic blank is preheated to above its softening temperature, stretched and, thereafter, controllably cooled to below the softening temperature before the stretching forces are relaxed. Controlled cooling is done in order to avoid the effects of plastic memory.

After the stretched acrylic sheet is cooled it is then ground and/or polished to remove any surface deformations to provide the requisite desired optical smoothness.

However, as is noted hereinabove, such stretched acrylic suffers from the p-static issues discussed hereinabove.

Thus, in a first embodiment hereof and, in accordance with the present invention, a transparency is prepared by casting a second or outer layer of a conductive acrylic on top of a ply of non-conductive acrylic.

The second or outer layer comprises a methyl methacrylate monomer or oligomer having a conductive polymeric compound in admixture therewith.

The conductive polymeric impregnant, generally, comprises a conductive polymer which is used to "fill" the methyl methacrylate monomer.

Amongst the useful conductive polymers are, for example, the polythiophenes, such as, poly(3,4-ethylenedioxythiophene), poly (3-octyl thiophene), a poly(3,4-ethylenedioxythiophene)-(polystyrenesulfonate) and the like and mixtures thereof.

In manufacturing the present transparency the amount of conductive polymer admixed with the methyl methacrylate will range from about 0.1 to about 10% by weight, of conductive material, based upon the entire weight of the outer layer and, preferably, from about 0.3 to about 5%, by weight, based upon the entire weight of the cap.

In preparing the outer layer the acrylate and the polythiophene are admixed under high shear.

Thereafter, the mixture is polymerized under traditional catalytic polymerization conditions.

Among the useful catalysts are, for example, benzoyl peroxide, azobisisobutyronitrile (AIBN) and the like as well as mixtures thereof.

Preferably, the catalyst is azobisisobutyronitrile (AIBN).

Generally, the catalyst is used in an amount of about 0.01 to about 0.2 parts, by weight, per 100 parts, by weight, of acrylic and, preferably, from about 0.02 to about 0.07 parts, by weight, per 100 parts, by weight, of acrylic.

In a second embodiment, the top layer may comprise a filled catalyzed methyl methacrylate having a cross-linking agent in admixture therewith which is cast against or onto a ply of unfilled stretchable acrylic. The two castings are then cured together. Curing, ordinarily, takes place in at a temperature ranging from about 120° F. to about 175° F. and is usually completed in about 2 to about 6 hours. After cure, the stack of the two acrylics are stretched together to give a stretched acrylic with a thin cap of conductive stretched acrylic.

The cross-linker used herein is, for example, triallyl isocyanate, and 1,3-butanediol dimethacrylate, 1,4-butanediol dimethacrylate, neopentyl glycol dimethacrylate and the like as well as mixtures thereof.

Generally, the cross-linker or cross-linking agent is present in an amount ranging from about one to about ten parts, by weight, based on 100 parts, by weight, of the acrylate and conductive polymer admixture and, preferably, from about three to about seven parts, by weight, of the cross-linker per 100 parts, by weight, of the admixture.

Alternatively, the cross-linking agent and a suitable solvent for both the acrylate and conductive ionic polymer may be admixed together therewith. The solvent places both the ionic conductor and the acrylate into solution and the solvent can then be driven off upon cure under the reaction conditions noted above.

A particular preferred solvent is then N-methyl-2-pyrrolidone (NMP).

As is known to those skilled in the art, typically, after casting and stretching some polishing and grinding may be necessary to improve light transmission through the conductive cap.

For a more complete understanding of the present invention reference is made to the following illustrative examples. In the examples, all parts are by weight. It is to be understood that the examples are to be construed as non-limiting and are provided for illustrative purposes only.

EXAMPLE I

Into a suitable vessel is charged 90 parts of methyl methacrylate with 5 parts of poly(3,4-ethyleneclioxythiophene)-poly(stryrenesulfonate) to which is added 5 parts of 1,4-butanediol dimethacrylate.

An additional 0.01 percent AIBN is also charged into the vessel. The reactants are mixed together under high speed with a high shear mixer until a homogeneous mixture is obtained. The mixture is then cast between glass plates and heated to about 175° for a period of four hours. The result is a p-static stretchable acrylic.

EXAMPLE II

Following the procedure of Example I a conductive cast acrylic is prepared by mixing together the above ingredients but deploying 95 parts of methyl methacrylate while eliminating the dimethacrylate cross-linking agent after casting between the glass plates. A conductive cast acrylic is obtained.

EXAMPLE III

Following the procedure of Example I a p-stretchable acrylic is obtained by mixing together 10 parts of N-methyl-2-pyrrolidone, 4.5 parts of the above-identified conductive polymer, 4.5 parts of 1,4-butanediol dimethacrylate and 81 parts of methyl methacrylate. The N-methyl-2-pyrrolidone places the ionic conductor and acrylate into solution which is, then, mixed under high shear. After a homogenous solution is obtained the mixture is then cast between glass plates under the same conditions outlined hereinabove. The above formula and process without the cross-linker yields a conductive cast acrylic.

EXAMPLE IV

Following the procedure of Example II a conductive cast acrylic is prepared from the same compounds, but using 85.5 parts of methyl methacrylate, while eliminating the cross-linking agent to yield a conductive cast acrylic.

It is to be appreciated by the preceding that there is obtained herein a p-static cap which can be cast atop non-conductive cast acrylic to provide an improved transparency for use where dissipation of p-static electricity is desired and, in particular, in aerospace applications. Additionally, a stretchable p-static cap can be cast atop non-conductive stretchable acrylic to provide a billet of conductive stretched acrylic that can subsequently be stretched.

Having thus described the invention what is claimed is:

1. A p-static dissipating acrylic transparency, comprising:
   a non-conductive stretched transparent cast acrylic sheet comprising poly(methyl methacrylate) and having a smooth surface formed by casting between a glass or polished metal plate; and
   a transparent cast acrylic cap overlaying the smooth surface of the cast acrylic sheet, the cap comprising poly(methyl methacrylate) and a conductive polymer incorporated therewith for dissipating p-static electricity, wherein the cast acrylic sheet and the cast acrylic cap are cured together and then stretched together to produce the acrylic transparency with the cap,
   wherein the transparent cast acrylic cap is fused to the non-conductive cast acrylic sheet, and wherein the acrylic cap further comprising a crosslinking agent comprising triallyl isocyanate and at least one of 1,3-butanediol dimethacrylate, 1,4-butanediol dimethacrylate, neopentyl glycol dimethacrylate, or mixtures thereof.

2. The transparency of claim 1 wherein the cast acrylic sheet is a stretched cast unfilled poly(methyl methacrylate).

3. The transparency of claim 1, wherein the cap is a stretched cast filled cross-linked poly(methyl methacrylate).

4. The transparency of claim 1, wherein the conductive polymer is a polythiophene.

5. The transparency of claim 4, wherein the thiophene is poly(3,4-ethylenedioxythiophene-poly(styrenesulfonate).

6. The transparency of claim 1 wherein the conductive polymer is poly(3,4-ethylenedioxythiophene-poly(3-octylthiophene).

7. An aircraft transparency comprising the transparency of claim 1, the cap dissipating p-static electricity.

8. The transparency of claim 1, wherein the non-conductive cast acrylic sheet and the acrylic cap each have a degree of crystallinity resulting from being stretched.

9. The transparency of claim 1, wherein the acrylic cap comprises from about 0.1% to about 10% by weight of the conductive polymer, based upon an entire weight of the cap.

10. The transparency of claim 1, wherein the acrylic cap comprises from about 0.3% to about 5% by weight of the conductive polymer, based upon an entire weight of the cap.

11. The transparency of claim 1, wherein the acrylic cap is formed from an admixture comprising the conductive polymer, the poly(methyl methacrylate) and the cross-linking agents.

12. The transparency of claim 11, wherein the admixture comprises from about one to about ten parts by weight of the cross-linking agents of the acrylic cap, based on 100 parts by weight of the admixture.

13. The transparency of claim 11, wherein the admixture comprises from about three to about seven parts by weight of the cross-linking agents of the acrylic cap, based on 100 parts by weight of the admixture.

14. The transparency of claim 11, wherein the cast acrylic sheet is formed from an admixture comprising the poly(methyl methacrylate) and a cross-linking agent.

* * * * *